US009804293B1

(12) United States Patent
Fendell

(10) Patent No.: US 9,804,293 B1
(45) Date of Patent: Oct. 31, 2017

(54) UAVS FOR THE DETECTION AND TRACKING OF INTENSE TORNADOES

(71) Applicant: NORTHROP GRUMMAN SYSTEMS CORPORATION, Falls Church, VA (US)

(72) Inventor: Francis E. Fendell, Los Angeles, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 15/098,061

(22) Filed: Apr. 13, 2016

(51) Int. Cl.
| G01W 1/08 | (2006.01) |
| G01W 1/06 | (2006.01) |
| B64C 39/02 | (2006.01) |
| H04N 5/225 | (2006.01) |

(52) U.S. Cl.
CPC ............ *G01W 1/08* (2013.01); *B64C 39/024* (2013.01); *G01W 1/06* (2013.01); *H04N 5/225* (2013.01); *B64C 2201/127* (2013.01)

(58) Field of Classification Search
CPC ........ G01W 1/08; G01W 1/06; B64C 39/024; B64C 2201/127; H04N 5/225
See application file for complete search history.

(56) References Cited

U.S. PATENT DOCUMENTS

| 5,853,311 | A | * | 12/1998 | Bartholomew | ........ | A63H 33/18 446/48 |
| 7,307,576 | B1 | | 12/2007 | Koenigs | | |
| 7,515,088 | B1 | * | 4/2009 | Woodell | .................. | G01S 7/003 342/175 |
| 7,558,674 | B1 | * | 7/2009 | Neilley | .................. | G01W 1/02 702/3 |
| 8,210,467 | B2 | * | 7/2012 | Hubbell | .................. | G01W 1/08 244/13 |

(Continued)

OTHER PUBLICATIONS

Solomon, David L. et al. "Tropopause-Penetrating Convection from Three-Dimensional Gridded NEXRAD Data" Journal of Applied Meteorology and Climatology, vol. 55, Feb. 2016, pp. 465-478.

(Continued)

*Primary Examiner* — Sath V Perungavoor
*Assistant Examiner* — Howard D Brown, Jr.
(74) *Attorney, Agent, or Firm* — John A. Miller; Miller IP Group, PLC

(57) ABSTRACT

A method for detecting tornadogenesis in a mesocyclone, and to monitor and track intense tornadic mesocyclones. The method includes flying a UAV above the mesocyclone for an extended period of time and detecting transition to tornadic stage. This further intensification is indicated by transition in a core structure of the mesocyclone to include the presence of an eye. The UAV can be a Global Hawk aircraft and can include a number of sensors and detectors, such as an imaging camera for providing imaging data of the mesocyclone-core structure, an infrared detector for detecting changes in heat in the mesocyclone-core structure, a radar detector for detecting wind magnitudes and direction in the mesocyclone-core structure, dropsonde sensors for measuring temperature, pressure, relative humidity and wind direction in the mesocyclone-core structure, etc. The UAV can relay the storm parameter data to a satellite for subsequent downlinking to receiving stations at the Earth's surface.

18 Claims, 1 Drawing Sheet

(56) References Cited

U.S. PATENT DOCUMENTS

| | | | |
|---|---|---|---|
| 8,903,571 B2 | 12/2014 | Kirk | |
| 9,535,158 B1* | 1/2017 | Breiholz | G01S 13/953 |
| 9,635,534 B2* | 4/2017 | Maier | H04M 1/7255 |
| 2006/0201547 A1* | 9/2006 | Rogers | B64G 1/428 |
| | | | 136/201 |
| 2009/0326792 A1* | 12/2009 | McGrath | G01W 1/08 |
| | | | 701/120 |
| 2010/0072296 A1* | 3/2010 | Konstantinovskiy | A01G 15/00 |
| | | | 239/2.1 |
| 2016/0011335 A1 | 1/2016 | Sasaki | |
| 2016/0059962 A1 | 3/2016 | Abuelsaad et al. | |
| 2016/0111006 A1* | 4/2016 | Srivastava | G08G 1/00 |
| | | | 701/3 |

OTHER PUBLICATIONS

Fendell, Francis et al. "Towards Modular Analysis of Tropical-Cyclone Structure: The Boundary Layer" J. Fluid Mech, vol. 731, 2013, pp. 223-258.

Elston, Jack S. et al. The Tempest Unmanned Aircraft System for In Situ Observations of Tornadic Supercells: Design and VORTEX2 Flight Results, Journal of Field Robotics, (28)4, 2011, pp. 461-483.

Eheim, Christian et al. "Tornadochaser: A Remotely-Piloted UAV for In Situ Meteorological Measurements" American Institute of Aeronautics and Astronautics, May 2002, pp. 1-8.

Carrier, G. et al. "Self-Sustaining Intense Vortices" Physica D. 77, 1994, pp. 77-96.

Elston, Jack, et al. "Design and Validation of a System for Targeted Observations of Tornadic Supercells Using Unmanned Aircraft" Intelligent Robots and Systems (IROS), 2010 IEEE/RSJ International Conference on. IEEE, 2010, 6 pgs.

Darack, Ed, "UAVs: The New Frontier for Weather Research and Prediction" http://www.weatherwise.org/Archives/Back%20Issues/2012/March-April%202012/UAVs-full.html, 7 pgs.

Frew, Eric W. et al. "Unmanned Aircraft Systems for Sampling Severe Local Storms and Related Phenomena" Robotics and Automation Magazine 19.1 (2012): 85-95, pp. 1-10.

* cited by examiner

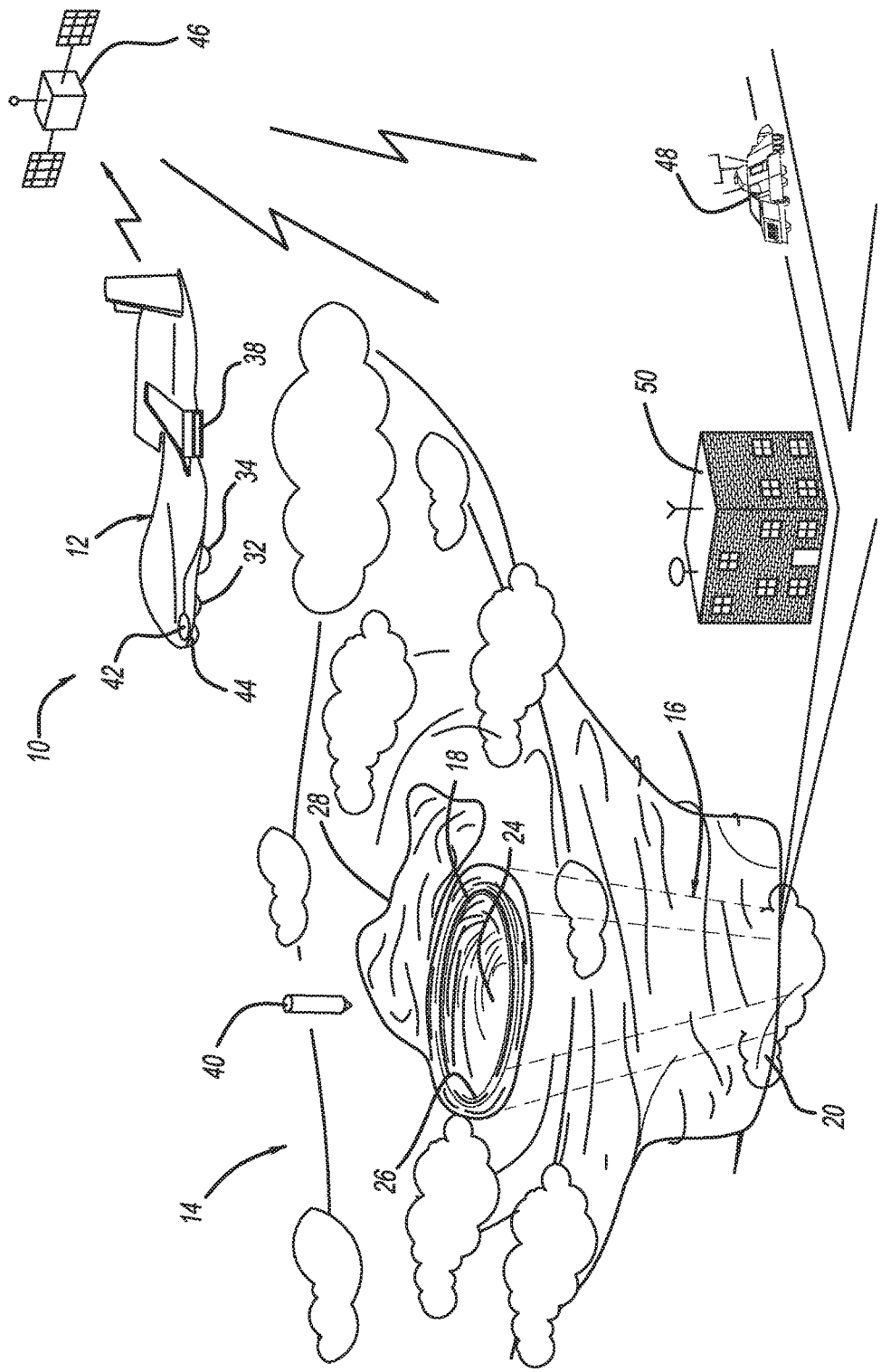

UAVS FOR THE DETECTION AND TRACKING OF INTENSE TORNADOES

BACKGROUND

Field

This invention relates generally to a system and method for detecting and tracking intense tornadoes and, more particularly, to a system and method for detecting and tracking intense tornadoes using an unmanned aerial vehicle (UAV) flying above a super-cell or mesocyclone, where the UAV includes sensors and detectors for detecting tornadogenesis by detecting formation of an eye-type structure near the center of the super-cell or mesocyclone.

Discussion

Certain areas of the country and worldwide are susceptible to the formation of tornadoes, especially at certain times of the year. For example, especially during the spring and fall on the Great Plains and in the Midwest of the United States, low-level, southerly, relatively warm and moist Gulf air that runs under mid- and upper-tropospheric, westerly, relatively cold, dry, fast-flowing air off of the Rocky Mountains often operates to create thunderstorms. If a thunderstorm transitions into a strong rotating vortex, termed a super-cell or mesocyclone, it could spawn one or more intense tornadoes. More specifically, most thunderstorms form in a tropospheric stratification characterized by convective available potential energy (CAPE) of 2000-3000 $m^2/s^2$. Further, a thunderstorm may develop in the presence of large vertical wind shear, such as >20 m/s below 4 km. Such wind shear then tilts a slow-to-develop convective cell perhaps 25° from vertical, so that a canted updraft rains out into a flanking downdraft. At the surface, the outflow from the downdraft lifts more convectively unstable air to its level of free convection so that an exceptionally long-lived, large-diameter thunderstorm persists. A subset of such thunderstorms can develop organized cyclonic rotation up to about a 25 m/s peak swirl, as indicated by a propensity to translate to the right of the pressure-weighted mean tropospheric wind. The fully developed rotating mesocyclone or super-cell may extend to a height of 15 km, and may persist in a nearly steady configuration for hours.

Depending on the characteristics of the parent thunderstorm, tornadoes of different sizes and intensities, generally classified on an extended Fujita (EF) scale from 0-5 on the basis of post-event damage assessment, can develop. A typical tornado is relatively small in diameter, is short-lived, and has a short path of narrow swath. A small percentage of tornadoes are intense tornadoes that are generally categorized in the EF 3-5 range and can be very destructive, often resulting in loss of life. Such long-path, long-lived, wide-swath, rapidly translating, high-swirl tornadoes are spawned virtually exclusively within super-cells. Early detection of very intense tornadoes to afford a long warning time is not only very important, but is relatively difficult.

The National Oceanic and Atmospheric Administration (NOAA) is a U.S. government agency that detects and tracks storms, and provides warnings to the public when appropriate. An important current basis for issuing a tornado warning relies on the use of Doppler radar, such as NEXRAD (next generation radar), which detects a rotating super-cell using the Doppler effect. NOAA's specific radar system for issuing tornado warnings employs dual-Doppler radars that are deployed on a roughly 240-km grid. These radar systems typically detect the parent mesovortex because they are rarely close enough to the super-cell to resolve an embedded tornado. Because the width of a tornado typically is less than the width of the spreading radar beam, Doppler radar provides, at best, a degraded indication of tornadogenesis in a mesocyclone, except for the rare case of a large tornado within a few km of the radar site. Thus, these types of radars are often not able to determine whether the center of a detected mesocyclone storm contains a tornado.

Only about 1 in 4 or 5 thunderstorms with organized rotation spawns even one long-path tornado, which is not inconsistent with NOAA's approximately 75% false-alarm rate, possibly resulting in warnings fatigue by residents of tornado-prone locales. NEXRAD radars are being upgraded with dual-polarization capability, but that is of limited effect for tracking long-lived rapidly translating super-cells with a possible embedded tornado. NOAA has also considered deploying short-range radars to fill gaps between the radar nodes in the NEXRAD network. However, this and other radar upgrades do not appear to be economically feasible or provide a reduced false-alarm rate of detecting tornadoes, especially intense tornadoes.

It has been postulated in the art that very intense tornadoes have significant differences from tornadoes of lesser intensity that may not be as destructive. Further, it has been proposed in the art that the occurrence of mid-latitude intense tornadoes involves transitions in the structure of the parent vortex that is analogous to the transition well known to occur in intense tropical cyclones. It has been recognized that in a tropical cyclone there are many different histories that may lead to attainment of the tropical-depression stage, but the varied antecedents make little difference once the tropical-depression stage is reached. Similarly, while non-axisymmetric, slant-wise convection, and wind-veer/wind-shear may be essential to inception stages, once a mesocyclone is formed, the mid-latitude vortex is roughly axisymmetric, and the mid-latitude vortex thenceforth shares many features with its tropical counterpart, albeit on vastly reduced temporal and lateral spatial scales. It is noted that a mesocyclone can achieve and lose tornadic-stage intensity several times. Thus, a single mesocyclone may go through a succession of 45-minute-or-so tornadic stages, just as tropical cyclones can revert back and forth between being a tropical storm and a hurricane. A major hurricane is a hurricane with an eye that extends most of, if not all, the way from the tropopause to sea level.

Therefore, the process by which a tropical depression typically evolves to a tropical storm, and then sometimes to a hurricane (or typhoon) including a centrally sited eye, may entail a process similar to how a mid-latitude mesocyclone may intensify further and achieve an intense tornadic stage. Thus, in order to detect these high-intensity tornadoes, it may be desirable to detect the formation of an eye-type structure, identified here as tornadogenesis, and indicative of significant further intensification in a super-cell. Tornadogenesis is the super-cell transitioning from a large rotating thunderstorm to an appreciably more intense vortex with an altered core structure. This transition is sometimes referred to in the industry as a transition from a one-cell structure to a two-cell structure, where the one-cell structure is a rotating super-cell without an eye, and the two-cell structure is a rotating super-cell with an eye surrounded by an eyewall. As is known in the art, the eye of a hurricane has relatively low turbulence, and the eyewall, the part of the storm adjacent to the eye, has the most violent turbulence. The same properties plausibly hold for the evolving super-cell.

SUMMARY

The present invention discloses and describes a system and method for detecting intensification, i.e., tornadogenesis, in a mesocyclone, and thereby to detect and track what is categorized commonly as a mesocyclone containing an intense tornado. The method includes flying a UAV, such as the Global Hawk, above the mesocyclone for an extended period of time to detect tornado-formation parameters indicating that the mesocyclone has achieved a tornadic stage, which involves the presence of an eye. The UAV can include a number of sensors and detectors, such as an imaging camera for providing imaging data of the mesocyclone-core structure, an infrared detector for detecting changes in heat in the mesocyclone-core structure, passive microwave detectors for detecting the vertical stratification of humidity and temperature in the mesocyclone-core structure, a radar detector for detecting wind direction in the mesocyclone-core structure, dropsonde sensors for measuring temperature, pressure, relative humidity and wind direction in the mesocyclone-core structure, etc. The UAV can relay the storm parameter data to a satellite for subsequent downlinking to receiving stations at the Earth's surface.

Additional features of the present invention will become apparent from the following description and appended claims, taken in conjunction with the accompanying drawings.

BRIEF DESCRIPTION OF THE DRAWING

FIG. 1 is an illustration of a UAV flying above a mesocyclone that has achieved a tornadic stage, where the UAV includes various sensors for detecting tornadogenesis.

DETAILED DESCRIPTION OF THE EMBODIMENTS

The following discussion of the embodiments of the invention directed to a system and method for detecting tornadogenesis in a mesocyclone using a UAV is merely exemplary in nature, and is in no way intended to limit the invention or its applications or uses. For example, as discussed herein, the system and method have particular application for detecting and tracking a high-intensity tornado. However, the system and method discussed herein may have application for detecting and tracking other types of storms, such as tropical cyclones or polar lows.

As will be discussed in detail below, the present invention proposes using a UAV, such as the Global Hawk, that flies above a mesocyclone to detect tornadogenesis that may result in a high-intensity tornado, wherein the mesocyclone transitions into a two-cell configuration including an eye and eyewall indicative of the tornadic stage of intensity. In this context, tornado intensity is defined by the magnitude of the sustained rotational wind speed, especially near the ground, in analogy with the tropical-cyclone counterpart. The UAV provides a high-altitude, long-endurance (HALE) vehicle that allows real-time monitoring of a severe-tornado-stage onset, persistence, and demise in super-cell thunderstorms through, for the Global Hawk, the exceptional combination of fast-flying, high-flying, long-mission, large-payload, large-on-board-power-supply, real-time-data-readout, and in-flight-mission-re-direction capabilities, along with multiple bays, pods, and hard points to accommodate payloads.

The UAV employs various remote and in situ detectors and sensors to detect thermofluid-dynamic phenomenology in a super-cell, in particular, a compressionally heated, relatively hydrometeor-free vertical vault inserted by downflow near the center of the mesocyclone at tornadogenesis. These detectors and sensors detect the relatively calm center of the tornadic-stage super-cell, indicating the presence of an eye wherein relatively little wind or rain is occurring, and which is surrounded by a violent area with a strong rotating updraft (the eyewall). The sensors and detectors can also detect a depression in the cloud deck defined by an eye that is surrounded by possible overshooting tops of the annulus with intense convection and rotation. This observable depression arises before a funnel may be observed at the ground level. The downward-looking perspective provided by the UAV is in contrast to the upward-looking perspective afforded by fixed or mobile ground-based radar or low-altitude UAVs.

FIG. 1 is an illustration 10 showing a Global Hawk UAV aircraft 12 flying above and offset from a mesocyclone 14 that contains a wedge-shaped tornado 16 having a wide upper end 18 and a narrow lower end 20, shown here touching the ground. A vortex that has achieved this high-intensity tornadic-stage probably would be classified as an EF 3-5 tornado on the basis of aftermath inspection. The vortex has a center eye 24 surrounded by an annular eyewall 26. The eye 24 of the tornadic-stage super-cell forms in the troposphere at the top of the mesocyclone 14, and, as the vortex intensifies, the eye descends. The extent of the descent may vary from storm to storm or with time during the duration of a tornadic-stage of a specific storm. The diameter of the eye 24 is greatest at the top and gradually tapers inward towards the base of the tornadic-stage structure. The most violent winds of the tornadic-stage structure occurs in the annular eyewall 26. The upward flow of air in the eyewall 26 may overshoot 28 its equilibrium level at the top of the vortex, which in exceptional circumstances could cause problems for the aircraft 12 if it were flying directly over the tornado 16. Thus, at least for some of the time, it may be judicious that the aircraft 12 is flying offset from over the top of the eye 24, although better detection may be provided the closer the aircraft 12 is to being directly above the eye 24.

The Global Hawk aircraft 12 includes a number of sensors, detector, cameras, etc. that are able to detect various atmospheric conditions and events, such as eye insertion, pressure, humidity, temperature, wind speed, wind direction etc., so as to determine at the earliest possible time that the mesocyclone 14 has transitioned into the intense tornadic stage including the eye 24. For example, the aircraft 12 may include a camera 32 that is able to take optical images of the mesocyclone 14, which may provide images and provide information showing various things, such as formation of the eye 24, the radial extent of the eye 24, the distance groundward to which the eye 24 extends, altitude of the overshoots 28, etc.

The aircraft 12 may also include an infrared detector 34 that detects changes in temperature with altitude in relatively cloud-free portions of the mesocyclone 14, such as the eye 24.

The aircraft 12 may also include a number of dropsonde sensors 38 that can be released on a variable schedule from the aircraft 12, where one of the dropsonde sensors 38 is shown as sensor 40 in a released state. As is known in the art, the dropsonde sensors 38 are expendable sensors and are deployable in the air from an aircraft and are applicable to measure in situ temperature, pressure, relative humidity, wind direction, etc., during decent, and transmit that data back to the aircraft 12 as the dropsonde 38 descends. The dropsonde sensor 38 may be able to detect the radial/axial circulation of air within the eye 24, where air at the center of the eye 24 may be flowing downward, and air in the eye 24 adjacent to the eyewall 26 may be flowing upward under shearing.

The aircraft 12 may also include a radar detector 42 for detecting hydrometeors from which may be inferred variations in air mass movement, such as wind direction and speed, especially in the eyewall 26. The radar detector 42 may be able to detect short-lived sub-vortices (so-called "suction vortices") in the annular eyewall 26 indicating the achievement of the intense tornadic stage.

The aircraft 12 may also include passive microwave sensors 44 for detecting temperature and humidity profiles within the core of the mesocyclone 14.

Data images and other information collected by the various detectors and sensors on the aircraft 12 as discussed herein can be sent to one or more satellites 46, where the data can be processed and sent to other satellites, a remote instrumented vehicle 48, a receiving station 50 on the ground, other aircraft, etc.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for detecting genesis of an intense tornado, said method comprising:
    determining that a mesocyclone without an intense tornado has formed;
    flying an unmanned aerial vehicle (UAV) above the mesocyclone in a flight pattern where the mesocyclone is continuously monitorable from above by the UAV; and
    continuously monitoring the mesocyclone until detecting tornadic-stage-structure parameters using a plurality of sensors on the UAV that provide an indication that the mesocyclone has evolved into a more intense tornadic-stage structure that includes a central eye surrounded by an eyewall, where the tornadic-stage-structure parameters include a depression in a top surface of an upper cloud deck of the mesocyclone, and the depression is detected via downward-looking images of the mesocyclone provided by an imaging camera.

2. The method according to claim 1 wherein detecting tornadic-stage-structure parameters includes using a radar detector to detect wind direction and speed in the mesocyclone.

3. The method according to claim 1 wherein detecting tornadic-stage-structure parameters includes dropping one or more dropsonde sensors from the UAV that measure temperature, pressure, relative humidity and wind direction and sending measurement data back to the UAV.

4. The method according to claim 1 wherein detecting tornadic-stage-structure parameters includes using an infrared detector for detecting changes in temperatures in cloud-free portions of the mesocyclone.

5. The method according to claim 1 wherein detecting tornadic-stage-structure parameters includes using passive microwave sensors for detecting temperature and humidity profiles in a core of the mesocyclone.

6. The method according to claim 1 further comprising transmitting storm data from the UAV to a satellite.

7. The method according to claim 1 wherein the UAV is a Global Hawk.

8. The method according to claim 1 wherein flying a UAV above the mesocyclone includes flying the UAV offset from the mesocyclone.

9. A method for detecting genesis of an intense tornado, said method comprising:
    flying a Global Hawk aircraft above a mesocyclone without an intense tornado, where the Global Hawk aircraft is flown in a flight pattern where the mesocyclone is continuously monitorable from above; and
    continuously monitoring the mesocyclone until detecting transition to a tornadic mesocyclone by detecting a central eye surrounded by an eyewall using a plurality of sensors on the Global Hawk aircraft, where detecting transition to a tornadic mesocyclone includes detecting a depression in a top surface of an upper cloud deck of the mesocyclone via downward-looking images of the mesocyclone provided by an imaging camera.

10. The method according to claim 9 wherein detecting transition to a tornadic mesocyclone includes using a radar detector to detect wind direction and speed in the transition to a tornadic mesocyclone.

11. The method according to claim 9 wherein detecting transition to a tornadic mesocyclone includes dropping one or more dropsonde sensors from the Global Hawk aircraft that measure temperature, pressure, relative humidity and wind direction and sending measurement data back to the Global Hawk aircraft.

12. The method according to claim 9 wherein detecting transition to a tornadic mesocyclone includes using an infrared detector for detecting changes in heat in the tornadic mesocyclone.

13. The method according to claim 9 wherein detecting transition to a tornadic mesocyclone includes using passive microwave sensors for detecting temperature and humidity profiles in the tornadic mesocyclone.

14. The method according to claim 9 wherein flying a Global Hawk aircraft above the mesocyclone includes flying the Global Hawk aircraft offset from the mesocyclone.

15. A method for detecting genesis of an intense tornado, said method comprising:
    determining that a mesocyclone without an intense tornado has formed;
    flying an unmanned aerial vehicle (UAV) above the mesocyclone in a flight pattern where the mesocyclone is continuously monitorable from above by the UAV; and
    continuously monitoring the mesocyclone until detecting tornadic-stage-structure parameters using a plurality of sensors on the UAV that provide an indication that the mesocyclone has formed into an intense tornadic mesocyclone including a central eye surrounded by an eyewall, wherein detecting tornadic-stage-structure parameters includes using a radar detector to detect wind direction and speed in the tornadic-stage-structure, dropping one or more dropsonde sensors from the UAV that measure temperature, pressure, relative humidity and wind direction and send measurement data back to the UAV, using an imaging camera for providing downward-looking image data of the tornadic-stage-structure indicated by a depression in a top surface of an upper cloud deck of the mesocyclone, using passive microwave sensors for detecting temperature and humidity profiles in the tornadic-stage-structure, and using an infrared detector for detecting changes in heat in the tornadic-stage-structure.

16. The method according to claim 15 further comprising transmitting data from the UAV to a satellite.

17. The method according to claim 15 wherein the UAV is a Global Hawk.

18. The method according to claim 15 wherein flying a UAV above the mesocyclone includes flying the UAV offset from the mesocyclone.

* * * * *